Feb. 28, 1950     J. C. MATHER ET AL     2,499,322
AUTOMATIC APERTURE CONTROLLING DEVICE

Filed May 8, 1948     3 Sheets-Sheet 1

INVENTOR.
JOHN C. MATHER and
BY FRANCIS G. SHENTON

AGENT OR ATTORNEY

INVENTOR.
JOHN C. MATHER and
BY FRANCIS G. SHENTON

AGENT OR ATTORNEY

Feb. 28, 1950     J. C. MATHER ET AL     2,499,322
AUTOMATIC APERTURE CONTROLLING DEVICE
Filed May 8, 1948     3 Sheets-Sheet 3

INVENTOR.
JOHN C. MATHER and
BY FRANCIS G. SHENTON

AGENT OR ATTORNEY

Patented Feb. 28, 1950

2,499,322

UNITED STATES PATENT OFFICE 2,499,322

AUTOMATIC APERTURE CONTROLLING DEVICE

John C. Mather and Francis George Shenton, Woodbury, N. J., assignors to Socony-Vacuum Oil Company, Incorporated, a corporation of New York Application May 8, 1948, Serial No. 25,874

4 Claims. (Cl. 250—43)

This invention relates to devices used to determine useful information about the composition of substances by observing the effect of the substance upon the distributions of energy of a source of radiation.

Although it is not meant to be limited thereby, this invention will be described with reference to a spectrometer used to examine spectra of energy of the infra-red region. Energy from a suitable source of infra-red radiation is allowed to enter the spectrometer through a rock salt window and slit opening. The radiation is focused upon a rock salt prism and refracted. The spectrum can be scanned by a mirror capable of being rotated and the radiant energy deflected to an inspection point. By suitable instrumentation the reflected energy may be measured and the rotatable mirror may be equipped with a calibrated scale to indicate the wave length of the energy being observed. The data obtained may be plotted to form a curve of radiant energy versus wave length, as shown on Figure 1. The sample to be inspected is then inserted between the spectrometer and the source of infra-red energy, whereby portions of the energy of the source will be absorbed by the sample at particular wave lengths, characteristic to the substance. By again plotting radiant energy versus wave length the modification of the original curve may be observed, wherein physicists may obtain much useful information of the composition of the substance. Heretofore, the plot of radiant energy versus wave length was automatically recorded on a strip, moving at a constant speed. The procedure was to move the rotatable mirror at a constant rate whereby the spectrum was scanned from the longest to the shortest wave length. Because of the steep slope of the radiant energy versus wave length curve, it was necessary to stop the scanning periodically to manually reset the inlet slit elements, because the curve reached the edge of the recording paper, as shown on Figure 2. This procedure was time consuming and laborious. Many methods have been proposed to make the scanning continuous by automatically resetting the slit elements during operation but all have been unsatisfactory for various reasons.

It is often desirable to observe only a portion of the spectrum, at the wave lengths at which absorption of energy is anticipated. Because the scanning mirror was turned at a slow speed by a constant R. P. M. motor or source of power, time was lost in reaching the portion of the spectrum in which the operator was interested.

It is an object of this invention to continuously examine electromagnetic radiation by keeping the electromagnetic radiation under observation below a predetermined energy limit.

It is a further object of this invention to produce a continuous, reproducible curve of radiant energy versus wave length over the entire frequency range of a source which emits radiant energy at a constant rate with respect to time.

It is a further object of this invention to reduce the time required to make a complete radiant energy versus wave length survey when when determining information about the composition of a substance in infra-red spectrometry.

It is a further object of this invention to reduce the labor required to make radiant energy versus wave length surveys when determining information about the composition of substances in infra-red spectrometry.

It is a further object of this invention to permit both automatic adjustment and manual adjustment of the slit members of an infra-red spectrometer.

Other objects and advantages will be made apparent in the following disclosure and appended claims.

Figure 3:
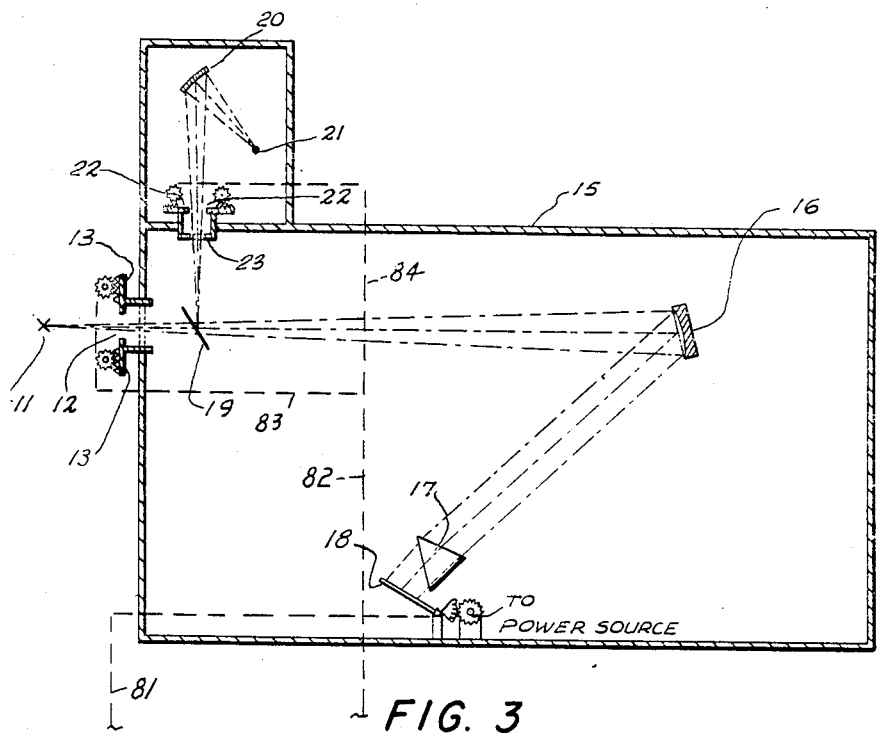
Figure 3 is a diagrammatic illustration of the optical system of a spectograph.

This invention may be described generally by reference to Figure 3. Radiant energy from an infra-red source 11, such as a Globar, or Nernst glower, is allowed to pass through a rock salt window 12, through a slit made by movable slit elements 13, 13, into the sealed box 15 of the spectograph. The radiant energy is directed by mirror 16 to a rock salt prism 17, whereby it is dispersed into its spectrum. A rotatable mirror 18 is used to reflect the energy back through the prism to the mirror 16, to the mirror 19, and through rock salt window 23 between movable slit elements 22, 22, out of the sealed box of the spectrograph. The radiant energy is then reflected from a mirror 20 to location 21 where it causes the operation of a bolometer, and attendant recording device, not shown. The rotatable mirror is operated by a source of power at a constant speed to scan the spectrum from one end to the other. The rotatable mirror is also used to operate electronic means for indicating the wave length of radiant energy being observed upon the above stated recording device. By this means a graphic record of radiant energy versus wave length is recorded. This procedure is completely described in the pending application of Frank G. Brockman, Serial No. 537,652, and need not be described in detail here.

Figure 1:
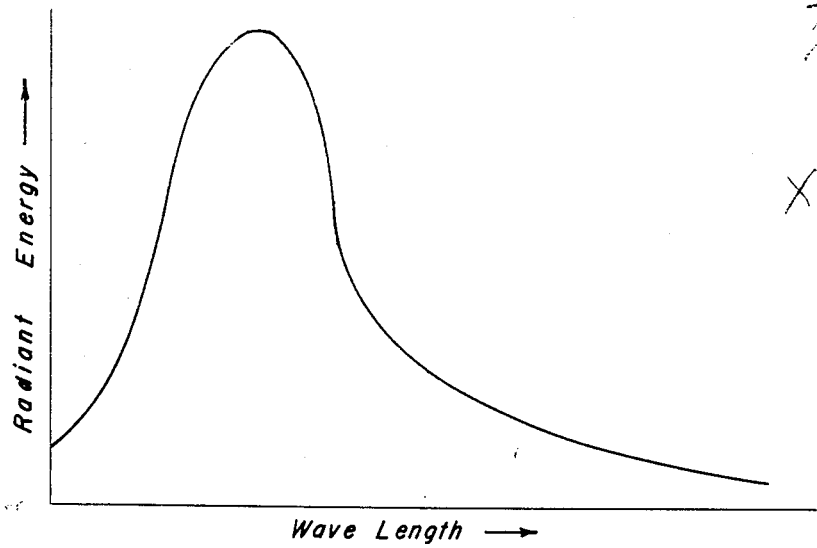
Figure 1 is a plot of radiant energy versus wave length for a black body radiator.
Figure 2:
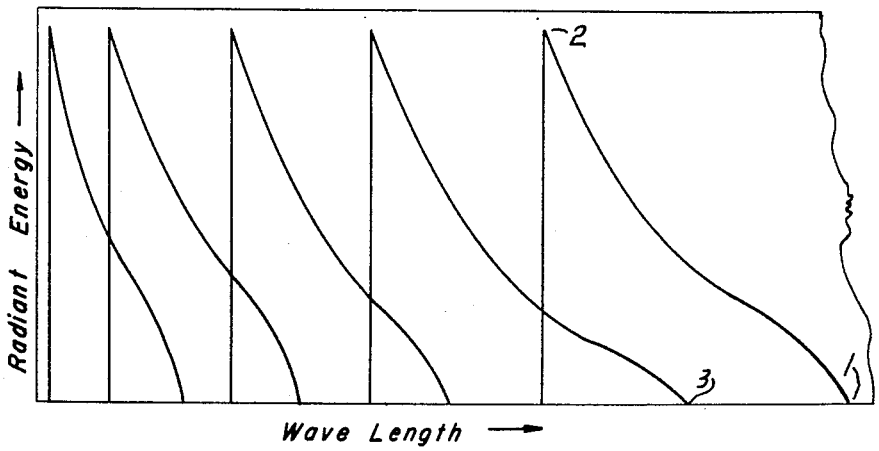
Figure 2 is a curve of radiant energy versus wave length as usually recorded by a spectograph when using monochromatic radiation as a source.

Because of the steep slope of the radiant energy versus wave length curve, as shown on Figure 1, the entrance and exit slits of the spectrograph must be reset several times during a survey. The entrance slit members 13, 13, and exit slit members 22, 22, are usually operable from a common drive. The survey is generally commenced at the longest wave length, approximately 15 microns, and continued through the infrared spectrum to the shortest wave length, approximately 2 microns. A complete survey of a source of infra-red radiation, as normally recorded by the infra-red spectrograph, is shown on Figure 2. The recording is started at point 1 and is continuous to point 2. The instrument is then stopped to prevent the pointer from going off the edge of the recorder strip. The slits of the spectrograph are made smaller by manually moving the slit members closer together, and the recording is restarted at 3. The record is made overlapping to insure that a complete survey is obtained.

Figure 4:
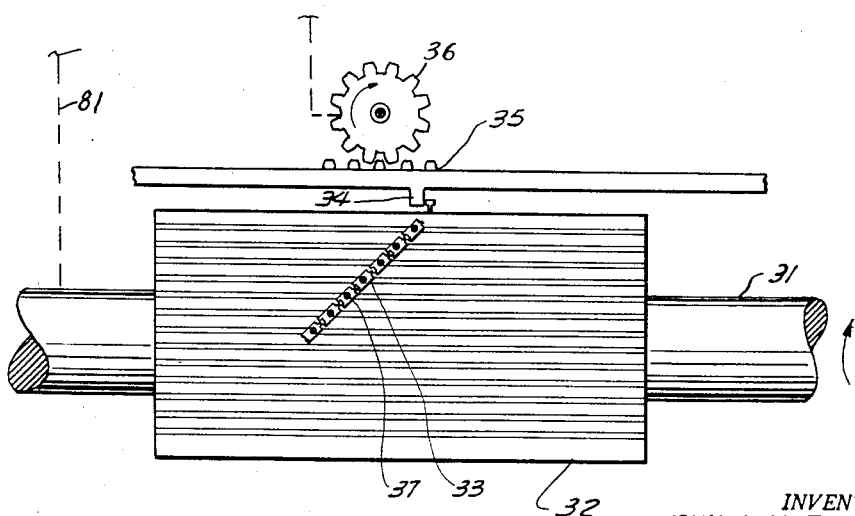
Figure 4 is a diagrammatic sketch of an adjustable drum type cam applicable to this invention.

This invention obviates the labor and time consuming elements of the above described system by automatically closing the slit members with respect to a known function, such as for example, the wave length inspected, as the survey is being made. The mechanism is adjusted to keep the slit opening at its maximum value until the recorder pencil reaches the edge of the recorder ribbon, and thereafter to automatically close the slit opening by moving the slit members closer together to prevent the recorder pencil from going off the ribbon. This is performed mechanically by rotating at constant speed a drum type cam, as shown on Figure 4. A source of power, not shown, for driving the drum at constant R. P. M. is attached to shaft 31. The drum 32 possesses a cam track made of adjustable lugs 33. The track operates against a follower 34, which is an integral part of a rack gear 35. The motion of the rack 35 causes the pinion gear 36 to rotate. The pinion gear is connected by gears and shafts, not shown, to the slit elements of the spectrograph, whereby the slit openings are controlled as above described. Because different sources of infra-red radiation are used, it is necessary, at times, to change the shape of the cam. This is easily performed by this invention because the lugs which make up the cam track are located in individual slots running longitudinally with respect to the axis of the drum. By loosening the lock screw 37, Figure 4, the lug can readily be moved to a new position to change the shape of the cam as desired. Thus the cam may be adjusted, preferably by trial and error, to cause the slit members to vary according to the intensity of the radiant energy being examined whereby the recorder pencil is prevented from going beyond a predetermined maximum value. The lugs on the cam may be adjusted to cause the pencil to follow any predetermined curve (i. e., express any desired predetermined variable function) for any sector of the radiant energy versus wave length curve.

Figure 5:
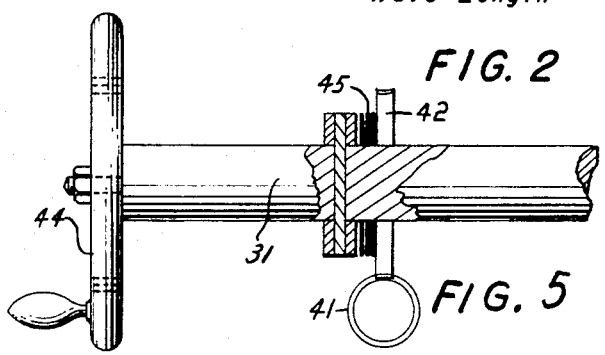
Figure 5 is a diagrammatic sketch of a manually operated friction type clutch applicable to this invention.

The cam drum is operated by a constant speed motor through a worm gear as shown on Figure 5. The worm gear 41 drives the worm wheel 42 which in turn drives the shaft 31 through a disk type friction clutch 45. The shaft 31 is connected to and drives the cam drum and the rotatable mirror of the spectrograph. In some instances, it is advantageous to examine only a portion of the radiant energy versus wave length curve. In order to make this possible without waiting for the motor to bring the instrument to the desired position, the wheel and handle 44 is provided, connected to shaft 31. When the handle is rotated the gears 41 and 42 lock, causing the clutch 45 to slip. The rotatable mirror and cam drum can then be rapidly set to any desired position. When the desired position is reached, the motor can be made to operate the instrument in the normal manner. This feature also makes it possible to rapidly reset the instrument to its starting position after each survey.

At times it is desired to set the slit openings irrespective of the wave length of energy being examined. This is accomplished in this invention by the insertion of the member shown in Figures 6 and 7, as described below, at some appropriate point in the mechanical linkage between the slit elements 13—13 and 22—22 of the spectrograph and the pinion gear 36 driven by the rack, shown in Figure 3.

Since the operation of the slit members is to be coordinated with the wave length, as noted above, the cam driving mechanism is mechanically linked with the drive for the rotating mirror 18. This linkage is diagrammatically indicated upon Figures 3 and 4 by dashed line 81. The further linkage of the cam with slit members 13—13 is indicated by dashed lines 82 and 83, and with slit members 22—22 by dashed lines 82 and 84. It will be obvious that as the spectrum is scanned by rotating mirror 18, for each portion of the curve reported, intensity adjustments will be automatically made in slit openings at 13—13 and 22—22 in accordance with the predetermined arrangement of the cam 32. Obviously, any form of positive linkage such as shafts and gearing, or chain drive, etc., may be used, the selection of type being a matter of design convenience.

Figure 6:
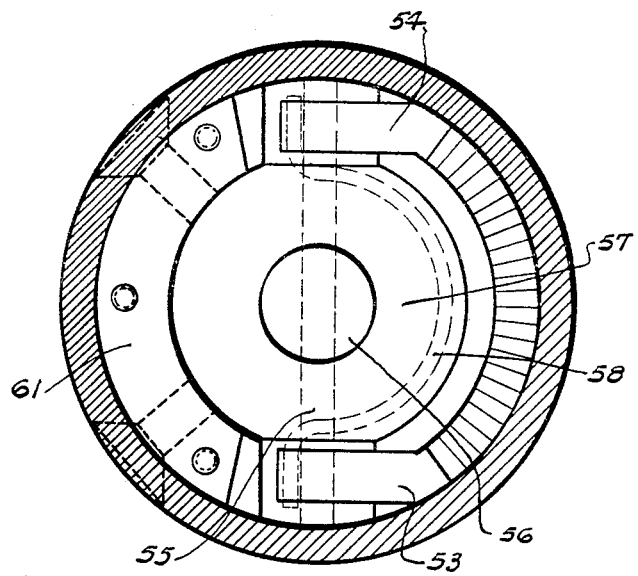
Figure 6 is a side view of a diagrammatic sketch, a portion of which is sectioned, of a manually operated over-riding device applicable to this invention.
Figure 7:
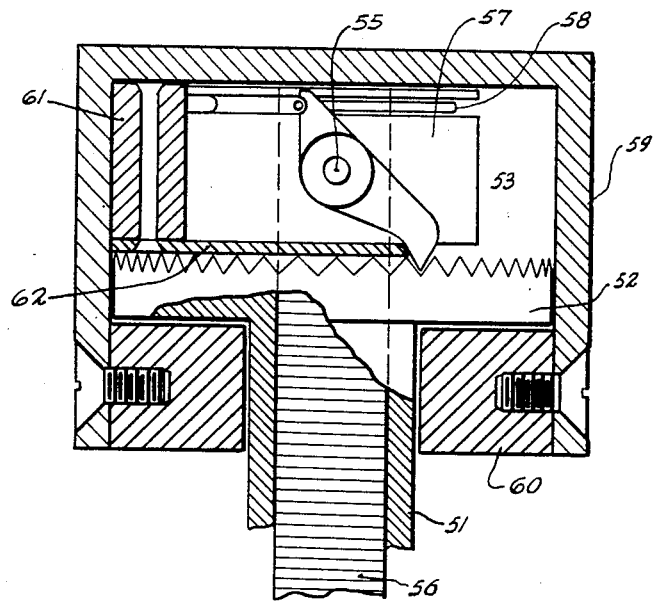
Figure 7 is a top view of a diagrammatic sketch, a portion of which is sectioned, of a manually operated over-riding device applicable to this invention.

Referring to Figures 6 and 7, a tube 51 which serves as the driving member is directly connected to a gear 52. Pawls 53 and 54 have teeth which mate with the gear teeth, and are pivoted on a shaft 55, which passes through one end of another shaft 56, which serves as the driven member. When the opposing pawls are engaged with the gear, the drive is positive in either direction. A cylinder 57 is disposed over the end of shaft 56 and connected thereto by the shaft 55 which passes through a hole in the side of the cylinder. A spring 58, fitted in a groove in the cylinder 57, has ends shaped to fit in recesses in the pawls, thereby exerting force to maintain the teeth of the pawls in engagement with the teeth of the gear 52. An outer cylinder 59 is used to enclose the device and serve as the manually operated member. A ring 60 serves to seal the device and maintain the outer cylinder 59 in position. Within the cylinder 59 a portion of a ring 61 is fastened to the outer cylinder and a member 62 is fastened to the bottom of the ring portion. The member 62 is disposed immediately above the gear 52 and is shaped such that rotation through a small portion of a revolution of the outer cylinder in either direction will cause the end of the member 62 to lift the driving pawl, disengaging it from the gear 52. At the same time, the ring portion 61 is brought into contact with the pawl, allowing the driven shaft 56 to be turned at will. The driven shaft 56 is connected by gears and shafts, not shown, to the entrance slit elements of the spectrograph. The slit members may, therefore, be adjusted manually to any desired position, as described above, or operated automatically as previously described.

Although this invention has been described with particular reference to an infra-red spectrograph, it is obvious that it has application to any instrument requiring an automatically varying aperture, wherein the rate at which the aperture is changed with respect to a known variable can be adjusted over a wide range.

We claim:

1. An apparatus for controlling the aperture defining means in an infra-red spectrometer that comprises a cam of cylindrical shape mounted for rotation about its longitudinal axis, said cam possessing a driving ridge located on the cylinder thereof, a follower adapted to engage the ridge of said cam, and a mechanical linkage connecting said follower with said aperture defining means whereby movement of said cam will produce a proportional change in the size of the aperture.

2. An apparatus for controlling the aperture defining means in an infra-red spectrometer that comprises a cam of cylindrical shape mounted for rotation about its longitudinal axis, lugs slidably located in longitudinal grooves in the surface of said cam, said lugs adapted to be locked in a fixed position and to coact with adjacent locked lugs to form a continuous ridge on the surface of said cam, a follower adapted to engage the ridge of said cam, and a mechanical linkage connecting said follower with said aperture defining means whereby movement of said cam will produce a proportional change in the size of the aperture.

3. An apparatus for automatically controlling the aperture defining means in an infra-red spectrometer while retaining the ability to selectively superimpose manual control thereof that comprises a cam, means for changing the wave length of the transmitted infra-red radiation, a common motive power for both cam means and wave length change means arranged to synchronize motion of the two means so driven, a follower adapted to engage said cam, a mechanical linkage connecting said follower with said aperture defining means whereby movement of said cam will produce a proportional change in the size of the aperture, and means for moving said aperture defining means irrespective of the movement of said cam comprising a driven shaft operably connected to said aperture-defining means to control same, a tubular driving shaft surrounding said driven shaft, said driving shaft being driven by said follower, a gear attached to the end of said driving shaft, spring-biased pawls pivotally attached to the end of said driven shaft adapted to contact the teeth of said gear to provide a positive drive therethrough, and an adjusting member associated with the driven shaft, pawl lifting means operated by rotation of said adjusting member relative to said driven shaft, and means to effect engagement of said adjusting member with said driven shaft after driving pawls are lifted whereby the aperture-defining means can be operated irrespective of the movement of the cam by said adjusting member.

4. An apparatus for automatically controlling the aperture defining means in an infra-red spectrometer while retaining the ability to selectively superimpose manual control thereof that comprises a cam, means for changing the wave length of the transmitted infra-red radiation, a common motive power for both cam means and wave length change means arranged to synchronize motion of the two means so driven, a follower adapted to engage said cam, a mechanical linkage connecting said follower with said aperture defining means whereby movement of said cam will produce a proportional change in the size of the aperture, and means for moving said aperture defining means irrespective of the movement of said cam comprising a driven shaft operably connected to said aperture-defining means to control same, a tubular driving shaft surrounding said driven shaft, said driving shaft being driven by said follower, a gear attached to the end of said driving shaft, a short pin located transversely through the end of said driven shaft, pawls pivotally located on the ends of said pin, each pawl adapted to drive in a direction opposite to the other, said pawls spring biased to contact said gear to permit positive driving therethrough, a housing covering the ends of said shafts but not positively attached thereto, a plate attached to the interior of said housing and located to partially cover the end of said gear, said plate shaped to permit both pawls to contact said gear simultaneously whereby rotation of said housing will cause the driving pawl to be lifted by the plate permitting independent rotation of the driven shaft and the housing will contact said pin to cause said driven shaft to rotate.

JOHN C. MATHER.
FRANCIS GEORGE SHENTON.

REFERENCES CITED

The following references are of record in the file of this patent:

UNITED STATES PATENTS

| Number | Name | Date |
| --- | --- | --- |
| 2,269,674 | Liddel et al. | Jan. 13, 1942 |
| 2,314,800 | Pineo | Mar. 23, 1943 |
| 2,376,311 | Hood | May 15, 1945 |
| 2,462,946 | Coggeshall et al. | Mar. 1, 1949 |